Dec. 8, 1964
G. F. VANDERSCHMIDT
3,160,809
CURRENT-SOURCE TRANSDUCER HIGH-VOLTAGE
LOW-CURRENT POWER SUPPLY SYSTEM
Filed Aug. 6, 1963
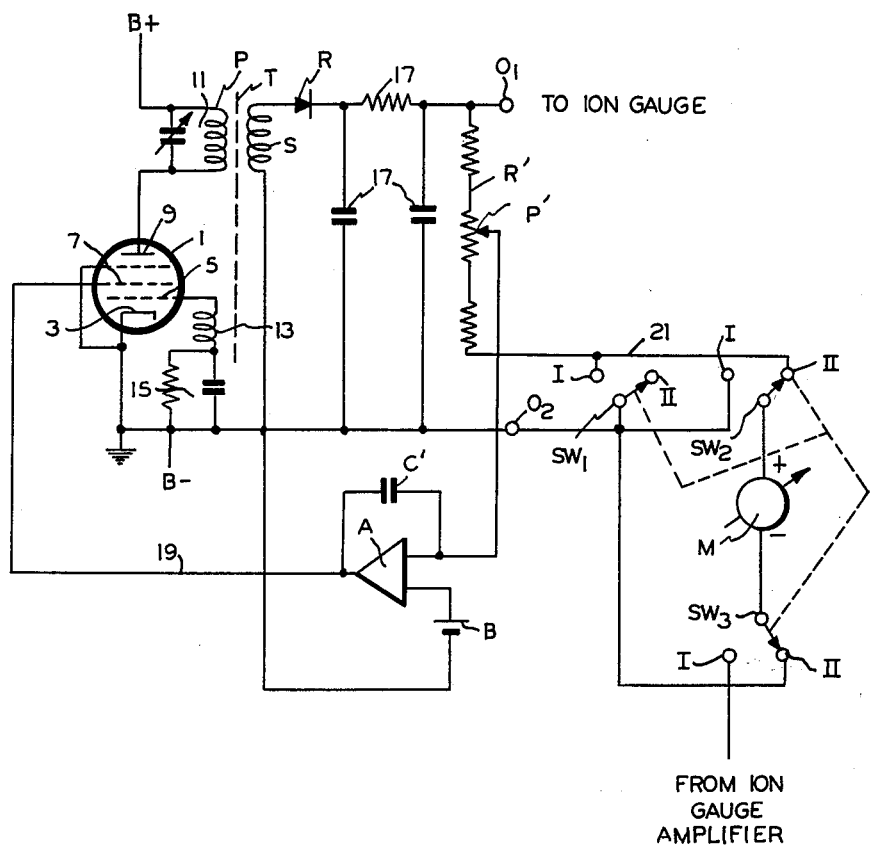
INVENTOR
GEORGE FREDERICK VANDERSCHMIDT
BY *Rines and Rines*
ATTORNEYS

3,160,809
CURRENT-SOURCE TRANSDUCER HIGH-VOLTAGE LOW-CURRENT POWER SUPPLY SYSTEM
George Frederick Vanderschmidt, Boston, Mass., assignor to Lion Research Corporation, Cambridge, Mass., a corporation of Massachusetts
Filed Aug. 6, 1963, Ser. No. 300,386
10 Claims. (Cl. 324—33)

The present invention relates to high-voltage, low-current power supply systems, and more particularly to such systems adapted for current-source transducers, such as ion gauges and the like.

Current-source type transducers, including photocells, ion chambers, ion gauges and similar apparatus, require a well-regulated high-voltage power supply, but draw very little current. It has heretofore proved difficult, particularly in applications where ion gauges and similar apparatus are being used in experimental setups, to provide the required high voltages with minimal danger of shock hazard to the experimenter, and with flexibility for insuring regulation over relatively wide ranges of voltage necessitated by operation with gauges requiring widely different operating voltages.

While resort has heretofore been had, in other applications, to radio-frequency power supplies that may reduce shock hazard in view of the utilization of small storage capacitors and the inability to supply high current when substantial loading is applied, such circuits have not heretofore been particularly adapted for the solution of the above problem with ion gauges and similar equipment in view of the requirement for regulation over a rather wide variation in output voltage.

It is, accordingly, to the solution of the problem of adapting radio-frequency type power supplies for utilization with such current-source types of transducers that the present invention is primarily directed; it being an object of the invention to provide a new and improved radio-frequency type high-voltage, low-current power supply that is particularly suited for operation with such devices as ion gauges, that is designed to provide minimal shock hazard to users of such devices, and that is well-regulated even though the output voltage be varied over relatively wide limits to accommodate the wide range of operating voltages required of the various types of ion gauge devices.

A further object of the invention is to provide a novel power supply system of more general utility, also.

Other and further objects will be explained hereinafter and will be more particularly pointed out in connection with the appended claims. In summary, however, the invention provides a high-voltage, low-current power supply having a radio-frequency oscillator that includes an amplifier provided with current-controlling electrode means and an output circuit. A transformer, preferably of the air-core type, is provided with a primary winding and a step-up secondary winding, the former of which is preferably connected as part of the oscillator output circuit and the latter of which connects to the input of a rectifier. At the rectifier output, a voltage divider network is provided to a predetermined point of which a regulating feedback circuit is connected. That feedback circuit includes a high gain operational amplifier of gain of the order of tens of thousands, providing regulating control to one of the current-controlling electrodes of the oscillator amplifier, the voltage-dividing network serving also as the $\beta$-network of the feedback circuit. Preferred constructional details are hereinafter set forth.

The invention will now be described in connection with the accompanying drawing, the single figure of which represents a schematic circuit diagram of the invention in preferred form.

Referring to the drawing, the radio-frequency oscillator is illustratively shown in the form of a tuned-plate resonant circuit electron tube oscillator, the electron tube amplifier 1 of which is provided with a cathode 3, a control grid electrode 5, a screen control electrode 7, and a plate or anode electrode 9. The anode electrode 9 connects with the tunable plate resonant circuit 11 which, in turn, is connected to the B+ terminal of the plate supply source, the negative terminal of which is shown grounded at B—. A cooperative input circuit coil 13 coupled to the resonant circuit 11 is connected from the control electrode 5 through an RC decoupling circuit 15 to the B— terminal. This oscillator circuit may generate radio-frequency oscillations of the order of 200 kilocycles, more or less; and other types of oscillators, including those embodying other types of amplifiers than electron tubes, may also be employed.

In accordance with the present invention, the coil P of the plate resonant circuit 11 of the oscillator is caused to serve, also, as the primary winding of a preferably air-core step-up transformer T, the step-up secondary winding S of which has its lower terminal connected to ground and its upper terminal connected to an input or left-hand terminal of a rectifier R to produce at an upper output terminal $O_1$ the required high direct-current voltage for application to the ion gauge or similar transducer. A $\pi$-type resistance-capacitance filter may be provided, as at 17. Connected between the upper output terminal $O_1$ and the grounded output terminal $O_2$ is a resistive voltage divider network $R'$, as later more fully described.

The dangers of the ion gauge user being seriously shocked are minimized by virtue of the fact that the high-frequency operation of the oscillator 1 enables the employment of small capacitors, so that there is low energy storage. In addition, the utilization of winding P of the oscillator resonant circuit 11 as the primary of the air-core step-up transformer T, provides a further shock hazard safeguard in that a high loading of the step-up secondary winding S will prevent the circuit 11 from resonating and thus developing the high-voltage energy. In normal operation, indeed, the order of a milliampere of current only may be passed through the resonant circuit transformer T.

Because regulation is required over relatively wide variations in high voltage at terminal $O_1$, ranging from, say, 3,000 to 10,000 volts for different ion gauges, a novel regulating feedback arrangement has been provided traceable from the tap-down point $P'$ of the voltage divider $R'$ through a high gain operational amplifier A (of gain of the order of tens of thousands, such as, for example, the Philbrick Company K2X amplifier), and thence by conductor 19 to close the feedback loop at the screen control electrode 7 of the oscillator amplifier tube 1. While the use of such very high gain operational amplifiers has not previously been considered feasible in many applications of radio-frequency oscillating power supplies, because of the danger of squegging oscillations being set up in view of such very high gain in the feedback circuit, a technique has been evolved in connection with the present invention for permitting such use as an excellent wide-range voltage variation regulator absent the danger of squegging or other spurious oscillations. Specifically, by rather critically changing the input-output phase characteristics of the conventional operational amplifier A to reduce the feedback loop gain of the feedback circuit at the high frequency end of the response of the amplifier A below unity, such spurious operation has been effectively avoided. This result is obtained through the employment of a high-frequency bypass capacitor $C'$ connected between the input and output of the operational amplifier A to reduce the loop gain at the high frequencies below unity. For the above given example, the capacitor $C'$ may have a value of the order of 0.002 microfarad. In this operation, the high voltage divider R' serves also as the β-network of the feedback circuit. Reference voltage for the operational amplifier A is shown obtained from battery B.

The voltage divider network R' will introduce very large attenuation in the voltage applied at P' to the input of the operational amplifier A, say, for example, attenuation from 10,000 volts at terminal $O_1$ down to an input voltage to the amplifier A of the order of 10 volts. The use of the very high gain amplifier A serves to boost this voltage back up with safeguards against any spurious oscillations resulting from this high gain feedback circuit. By applying the feedback voltage to the screen grid 7, the amount of current fed to the primary winding P of the step-up transformer T is controlled, and it has been found possible to provide excellent regulation of the radio-frequency power supply over wide voltage ranges from a few thousand volts up to the order of 10,000 volts, more or less.

In view of the expensive nature of the high-voltage resistors R', a way has been found for enabling the voltage divider R' to be used as part of a voltage indicating or measuring circuit. With switch SW2 in the position shown, the lower terminal of the divider R' is connected by conductor 21 to a switch position II and thence to the positive terminal of a current measuring meter M, the negative terminal of which connects through a further switch SW3 and its contact position II to the grounded output terminal $O_2$ that, in turn, connects through the reference voltage B to the input of the operational amplifier A. The meter M is thus, in effect, connected in the feedback circuit, and its substantially zero resistance causes it to exert no influence therein but enables a direct measurement of the output voltage produced by the power supply.

In ion gauge measurement operations and the like, however, it is frequently necessary rapidly to switch from a measurement of the ion gauge supply voltage to a measurement of the electrometer or ion gauge amplifier output associated with the gauge to determine the output current thereof. This may, of course, be done with separate metering equipment; but, in accordance with further features of the invention, the same meter M is removable from the feedback circuit, where it measures the power supply output voltage, without interrupting the flow of feedback current which would otherwise produce transient instabilities, and is connectable in a required reverse-polarity manner to measure the ion gauge amplifier output current. This is effected by employing switches SW1, SW2, and SW3 of the shorting type, such as, for example, the Centralab Series 2500, and ganging the same, as indicated by dashed lines, to multiple-position connections: first, the switch SW1 moves from its open contact position II to ground the voltage divider network R' at its switch position I; secondly, switch SW2, without circuit interruption, disconnects the meter M from the conductor 21 and thus removes the meter from the feedback circuit, and simultaneously connects the positive terminal of the meter to the ground terminal $O_2$; and thirdly, the switch SW3 connects to its position I and thus connects the negative terminal of the meter M to the ion gauge amplifier output to enable the measurement of the ion gauge output current.

Further modifications will also occur to those skilled in this art and all such are considered to fall within the spirit and scope of the invention as defined in the appended claims.

What is claimed is:

1. A high-voltage, low-current power supply for current-source transducer means including ion gauges, having, in combination, a radio-frequency oscillator including an amplifier provided with current-controlling electrode means and an output circuit, a transformer provided with primary and step-up secondary windings, means for connecting the said output circuit to the primary winding, rectifier means having input and output terminals, the latter of which connect to opposite ends of a voltage-divider network, means for connecting the secondary winding with the said rectifier means input terminals, means for connecting the rectifier output terminals with the said current-source transducer means, a regulating feedback circuit including high-gain operational amplifier means of gain of the order of tens of thousands connected between a point of the said voltage-divider network and one of the said oscillator current-controlling electrode means, the said network serving also as the β-network of the feedback circuit, and high-frequency bypass capacitive means shunted across the operational amplifier means in the said feedback circuit to reduce the loop gain of the feedback circuit at high frequencies below unity.

2. Apparatus as claimed in claim 1 and in which the said primary winding serves also as part of the oscillator resonant circuit.

3. Apparatus as claimed in claim 1 and in which the said transformer is an air-core step-up transformer.

4. Apparatus as claimed in claim 2 and in which the said amplifier is an electron tube having at least cathode, control, screen and anode electrodes, the said primary winding being connected between the anode and cathode electrodes and serving as a portion of the oscillator resonant circuit, the control electrode being connected with another portion of the oscillator resonant circuit, and the said operational amplifier means being connected between the said voltage-divider network and the said screen electrode.

5. Apparatus as claimed in claim 1 and in which current-measuring meter means is connected in the said feedback circuit between the voltage-divider network and the operational amplifier means.

6. Apparatus as claimed in claim 5 and in which switching means is provided for removing the meter means from the said feedback circuit while preventing the interruption of current in the feedback circuit.

7. Apparatus as claimed in claim 6 and in which there is provided further amplifier means, and means cooperative with the said switching means for reversedly connecting the further amplifier means to the meter means upon the removal of the meter means from the feedback circuit.

8. Apparatus of the character described comprising a high-voltage, low-current power supply having a voltage-divider output network, a regulating feedback circuit including high gain operational amplifier means connected between a point of the voltage-divider network and another point of the power supply, the network serving also as the β-network of the feedback circuit, current-measuring meter means, and multiple-position switching means disposed to connect the meter means between the voltage divider network and the operational amplifier means in one position, and to remove the meter means from the feedback circuit in another position while preventing the interruption of current in the feedback circuit.

9. Apparatus as claimed in claim 8 and in which means is further provided, upon the removal of the meter means from the feedback circuit, for reversedly connecting the meter means to external apparatus.

10. Apparatus as claimed in claim 9 and in which the power supply is connected to an ion gauge and the said external apparatus is ion gauge amplifier means for measuring the output current of the ion gauge.

No references cited.